United States Patent [19]
Solorzano et al.

[11] Patent Number: 5,610,962
[45] Date of Patent: Mar. 11, 1997

[54] CONSTRUCTION OF NUCLEAR POWER PLANTS ON DEEP ROCK OVERLAIN BY WEAK SOIL DEPOSITS

[75] Inventors: Enrique R. Solorzano, San Jose; Perng-Fei Gou, Saratoga; Thomas S. Higa, San Jose; Harold E. Townsend, Campbell, all of Calif.

[73] Assignee: General Electric Company, San Jose, Calif.

[21] Appl. No.: 532,189

[22] Filed: Sep. 22, 1995

[51] Int. Cl.⁶ ................................................. G21C 13/024
[52] U.S. Cl. .......................... 376/461; 376/285; 376/260; 52/167.7; 405/229
[58] Field of Search ..................................... 376/260, 273, 376/285, 293, 461; 52/167.4, 167.7, 167.8, 169.9; 405/229, 230

[56] References Cited

U.S. PATENT DOCUMENTS

| | | | |
|---|---|---|---|
| 4,045,289 | 8/1977 | Seidensticker et al. | 376/273 |
| 4,599,834 | 7/1986 | Fujimoto et al. | 52/167.8 |
| 4,744,941 | 5/1988 | Bacher et al. | 376/285 |
| 4,754,588 | 7/1988 | Gregory | 405/229 |
| 5,131,790 | 7/1992 | Simpson | 405/229 |

*Primary Examiner*—Daniel D. Wasil
*Attorney, Agent, or Firm*—James E. McGinness

[57] ABSTRACT

A nuclear power generation complex constructed on a stratum of rock overlain by soil deposits. All major structures in the power generation complex (i.e., reactor, turbine, radwaste and control buildings) are located on a common mat foundation that houses elastomeric bearings or seismic isolators. The foundation includes a concrete slab supported by a plurality of pedestals. Each of the pedestals is embedded in the rock. Preferably, each pedestal is a circular metal shell filled with underwater-type concrete, and the concrete slab is reinforced with steel bars. For example, a reactor building is supported by one set of seismic isolators mounted on the concrete slab, and a turbine building is supported by another set of seismic isolators mounted on the concrete slab. The isolators filter out a great deal of the seismic vibratory inputs. The common mat foundation eliminates differential movements between the buildings.

20 Claims, 1 Drawing Sheet

5,610,962

CONSTRUCTION OF NUCLEAR POWER PLANTS ON DEEP ROCK OVERLAIN BY WEAK SOIL DEPOSITS

FIELD OF THE INVENTION

This invention relates to the construction of nuclear power plants which are designed to comply with safety standards for seismic events. In particular, the invention relates to the construction of nuclear power plants at sites where weak soil foundation material overlies deep rock.

BACKGROUND OF THE INVENTION

Nuclear power plants are designed to withstand the ground motion caused by the most severe earthquake that is likely to be experienced. Seismic analysis must show that the reactor can be safely shutdown in the event of such an earthquake. The components and structures vital to safe shutdown are referred to as Safety Class I structures.

When rock is located at great depths from the natural ground surface (in excess of 30 meters or about 100 feet), it is very costly and time consuming to provide Safety Class I foundations utilizing conventional building mat foundations. The seismic accelerations that emanate from the rock boundaries are significantly amplified through the soil, resulting in very high seismic forces on the structures, systems and components of a nuclear power plant. The liquefaction potential under seismic excitation severely impacts the underground foundations in conventional designs.

Thus, there is a need for a new construction scheme that overcomes weak soil foundation material overlying deep rock on sites selected for nuclear power plants. This construction scheme must minimize the effect on power plant structures, systems and components of seismic events. Also the scheme should be able to accommodate different types of plants.

SUMMARY OF THE INVENTION

The present invention is a novel design scheme for constructing nuclear power plants on deep rock overlain by weak soil deposits. The invention employs a simple foundation construction to penetrate through the weak soil and embed on the competent rock material (soft or hard rock). Structural concrete is the preferred medium used to bridge the weak soil material. In accordance with a preferred embodiment of the present invention, the foundation construction comprising a plurality of caissons which are filled with underwater-type (tremie) concrete. Alternatively, piles or any type of foundation structure made of reinforced concrete can be used to transmit the structural loads supported thereby through the weak soil material to competent rock.

To minimize the seismic effects on the structures, systems and components of the nuclear power plant, elastomeric (rubber) bearings or seismic isolators (or filters) are used to support the plant buildings. Such isolators filter out a great deal of the seismic vibratory inputs. All major structures in the power generation complex (i.e., reactor, turbine, radwaste and control buildings) are located on a common mat foundation that houses the elastomeric bearings or seismic isolators and minimizes differential movements between the buildings.

The construction scheme in accordance with the present invention will accommodate a large number of different types of designs for nuclear power plants. Alternatively, the invention can be applied to non-nuclear power plants or other industrial facilities, such as oil refineries and chemical plants. The invention makes it possible to standardize the design of the power generation complex and use it at different types of sites. The only variable is the fine-tuning of the details of the foundation structure and the seismic isolators, such as elastomeric bearings, that absorb energy during an earthquake.

In general, seismic loads on the nuclear power generation complex affect the design of structures, systems and components significantly. Seismic loads depend on whether the complex is located in a high- or a low-seismic-activity area. Through the filtering and isolating properties of the seismic isolators, the seismic motion of the structures, systems and components in a nuclear power generation complex is controlled such that a standard set of envelope design values for the structure above the isolators can be defined independent of sites including high-seismic-activity locations. Since the elevation of rock also varies from location to location, by varying only the length of caissons, a standard general embedment can be selected independent of sites. Thus, a standard design of a nuclear power generation complex can be achieved.

DETAILED DESCRIPTION OF THE PREFERRED EMBODIMENTS

Figure 2:
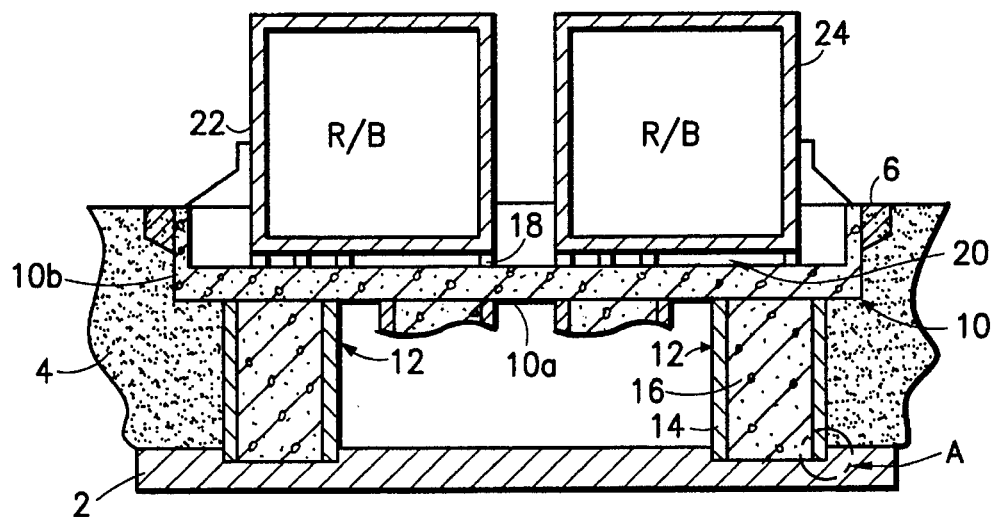
FIG. 2 is a schematic sectional elevation view of the construction foundation depicted in FIG. 1 taken along section line 2—2 indicated in FIG. 1.

With reference to FIG. 2, the construction foundation in accordance with the preferred embodiment of the present invention comprises an isolation pit or vault 10 having a horizontal slab floor 10a which supports the power generation complex and a wall 10b which extends vertically upward from the periphery of slab floor 10a. Preferably, the isolation vault 10 is made of concrete which is reinforced with steel bars. The thickness of the slab floor 10a may be on the order of 3 m. The peripheral wall 10b may be less thick, i.e., on the order of 1.5 m.

Figure 1:
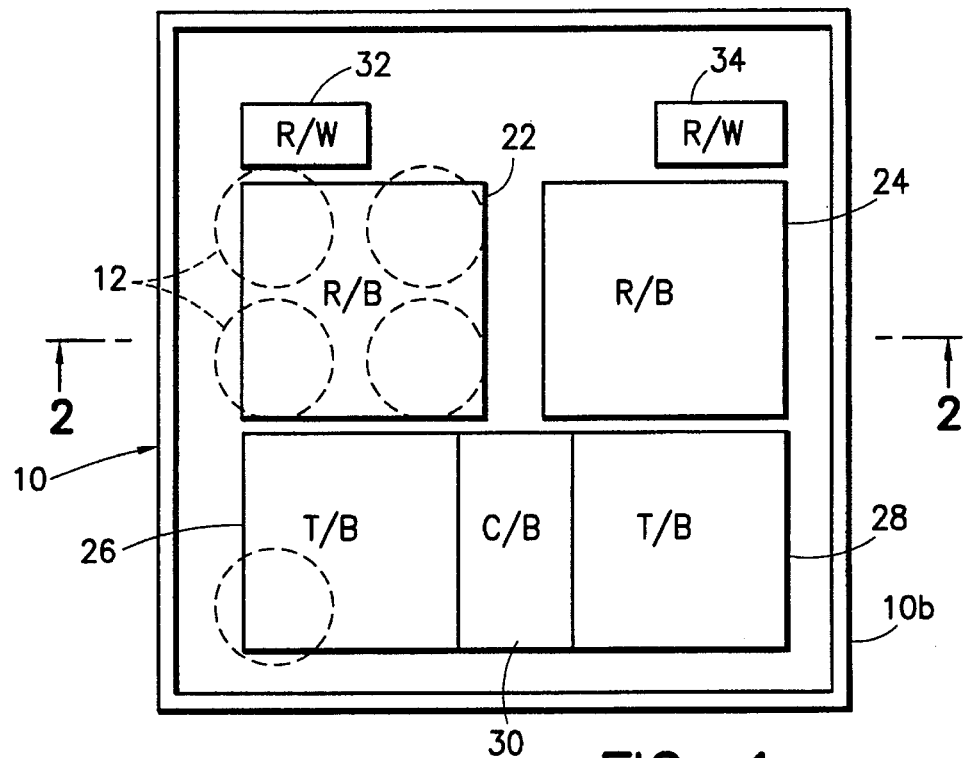
FIG. 1 is a plot plan of a construction foundation for deep rock sites in accordance with a preferred embodiment of the invention.

As best seen in FIG. 1, an exemplary power complex comprises a pair of reactor buildings 22 and 24, a pair of turbine buildings 26 and 28, a control building 30, and a pair of radwaste buildings 32 and 34. These buildings are arranged on the slab floor 10a, preferably in a manner that minimizes the area occupied by the complex. Although the exemplary slab floor in FIG. 1 has a square configuration, in practice the shape of the slab floor 10 can be adapted to suit the particular plant arrangement and/or the underlying terrain.

As shown in FIG. 2, the isolation vault 10 is vertically supported by a plurality of pedestals 12 which stand on a rock stratum 2 which underlies a top stratum 4 of weak soil. Although a 4×4 array of pedestals is depicted in FIGS. 1 and 2, it will be readily apparent to a skilled seismic engineer that the number of pedestals need not be sixteen. Nor do the pedestals need to be arrayed in rows and columns or spaced at equal distances from each other. The spacing and arrangement of the pedestals can be adjusted to suit the slab floor configuration and/or the underlying terrain or to provide a predetermined load-deflection characteristic.

Figure 3:
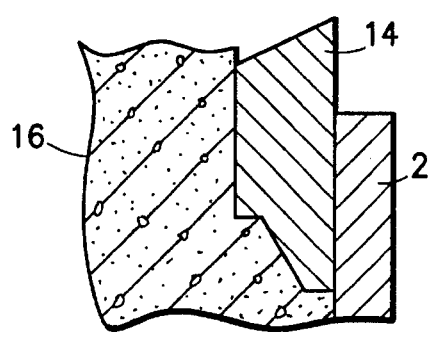
FIG. 3 is a magnified view of detail A indicated in FIG. 2.

As best seen in FIG. 2, each pedestal 12 preferably comprises a caisson 14 filled with tremie concrete 16, which is a type of concrete containing additives which prevent dissolution of the concrete when it is submerged in water. Each caisson 14 is a large (e.g., 30 m in diameter) circular cylindrical shell (shown in detail in FIG. 3), preferably fabricated from structural steel and filled with lean concrete. Alternatively, each caisson may comprise a concrete member which surrounds the concrete mass which sits on the rock stratum. The thickness of the shell may be on the order of 3.5 m. The height of each caisson will be a function of the depth of the upper boundary of the rock stratum 2 at the site where each caisson is embedded. The upper end of each pedestal supports a corresponding area under the slab floor 10a of the isolation vault 10. In totality, the pedestal array supports the slab floor 10a in a generally horizontal position.

To construct the pedestals, first the weak soil stratum 4 in the top few meters of the soil strata is excavated. Then the lower end of each caisson 14 is sunk through the remaining soil stratum into the rock stratum 2 until the tops of the caissons all lie in a horizontal plane at the desired elevation. After the volumes inside the caisson are dredged to remove loose rock, soil and water, the caissons are backfilled with tremie concrete to form a very rigid and massive support structure. This structure will carry and transmit all the loads applied on the isolation vault 10 to the rock foundation 2.

In accordance with the preferred embodiment of the present invention, each building (22, 24, 26, 28, 30, 32 and 34 in FIG. 1) of the power generation complex is independently supported on the slab floor 10a of the isolation vault 10 by means of a respective set of elastomeric bearings 18. These elastomeric bearings act as seismic isolators to maintain the structural integrity of the buildings during earthquakes and allow uncoupled movement between those buildings and the supporting isolation vault. The seismic isolators, which may be conventional in design and construction, support the bottom of the buildings at a predetermined height above the top surface of the slab floor 10a of the isolation vault 10. Preferably, that predetermined height is sufficient (e.g., on the order of 2 m) to form an inspection gallery 20 that provides access for power plant personnel to perform inspection and maintenance of the isolators.

Using the above-described foundation design, the power generation complex is virtually supported on the deep rock. The large circular pedestals form a very rigid and massive support structure that transmits all loads to the rock foundation. The proposed construction is simple and well established, with ample tolerances. The isolation vault, likewise, is built with conventional materials and techniques. The elastomeric bearings are selected to isolate the power generation complex structures from lateral seismic loads originating in the rock foundation. The elastomeric bearings act as shear springs. They accommodate large displacements and absorb energy in the process of moving horizontally. They are sized for each individual site application. The lateral oscillation of the isolator vault may be reduced by the placement of stabilized soil 6 along the outer periphery of vertical wall 10b. This soil is stabilized by densification using vibration.

The use of seismic isolators (filters) in combination with the large concrete mass down to rock is a unique concept, allowing for standardization of the structure above the isolators. Although the preferred embedment has been described in connection with a nuclear power generation complex, it will be apparent that any kind of facility requiring protection from seismic events can be constructed on the isolation vault of the present invention.

The idea and the concept presented herein furnish a means for a conceptual design that will provide an economical foundation for a nuclear power plant (or other industrial facility) sited on weak soil overlying competent (soft or hard) rock. This design will minimize the seismic loads to the nuclear power plant structures, systems and components. In addition, this design minimizes the amount of time needed to construct the foundation.

As a result of the present invention, the use of a standard nuclear power plant design is made feasible without regard to whether the site is located on weak soil and in an area of high seismic activity. Also, this design allows the placement of the major components of the power generation complex closer together, thereby minimizing the plant acreage needed and reducing differential movements between buildings. For the first time ever, it will be possible to examine, monitor and adjust the foundation supports for a nuclear facility.

The preferred embedments have been disclosed for the purpose of illustration only. Variations and modifications of the structure disclosed herein will be readily apparent to skilled engineers. For example, the isolation concept of the invention is versatile enough to allow for different methods of foundation construction (depending on soil depth). FIG. 2 is shown for a sample site where the rock surface is assumed to be about 35 m below the slab floor bottom of the isolation vault 10. Caisson dimensions can be reduced up to the point where no caissons are used for relatively shallow sites and the concrete fill is made with conventional forms. More substantial caissons or a set of concentric caissons could be used for sites having a deeper top surface of the rock stratum 2. Where caissons are used, the space between caissons can be filled with sand, cement or any other suitable material, depending on design requirements. All such variations and modifications are intended to be encompassed by the claims set forth hereinafter.

We claim:

1. A facility constructed on a stratum of rock overlain by soil deposits, comprising:

a plurality of caissons each filled with concrete each caisson having a bottom end which sits on said rock stratum and a top end located at a predetermined elevation;

an isolation vault comprising a floor which is vertically supported in a horizontal position above said soil deposits by the top ends of said plurality of concrete-filled caissons;

a first plurality of seismic isolators mounted on said floor of said isolation vault;

a first building supported only by said first plurality of seismic isolators;

a second plurality of seismic isolators mounted on said floor of said isolation vault; and a second building supported only by said second plurality of seismic isolators, wherein said first and second buildings have a predetermined spacing therebetween.

2. The facility as defined in claim 1, wherein said first building is a first nuclear reactor building.

3. The facility as defined in claim 2, wherein said second building is a second nuclear reactor building.

4. The facility as defined in claim 1, wherein said first building is a nuclear reactor building and said second building is a turbine building.

5. The facility as defined in claim 1, wherein each one of said caissons comprises a metal shell.

6. The facility as defined in claim 1, wherein each one of said caissons comprises a concrete member surrounds and encloses a corresponding one of said concrete.

7. The facility as defined in claim 5, wherein a lower end of each one of said caissons is embedded in said rock stratum.

8. The facility as defined in claim 1, wherein said floor is made of reinforced concrete.

9. The facility as defined in claim 1, wherein said isolation vault further comprises a vertical wall extending upward from a periphery of said floor.

10. The facility as defined in claim 9, wherein soil surrounding said vertical wall and adjacent thereto is denser than other soil surrounding said denser soil and further removed from said vertical wall.

11. A nuclear power generation complex constructed on a stratum of rock overlain by soil deposits, comprising:

a concrete slab supported above said soil deposits by a plurality of pedestals, each of said pedestals being seated on said rock stratum and comprising a caisson filled with concrete;

a first plurality of seismic isolators mounted on said slab;

a first building supported only by said first plurality of seismic isolators;

a second plurality of seismic isolators mounted on said floor of said slab; and a second building supported only by said second plurality of seismic isolators, wherein said first and second buildings have a predetermined spacing therebetween.

12. The nuclear power generation complex as defined in claim 11, wherein each of said caissons comprises a metal shell.

13. The nuclear power generation complex as defined in claim 11, wherein each of said caissons comprises a concrete member.

14. The nuclear power generation complex as defined in claim 11, wherein a lower end of each one of said caissons is embedded in said rock stratum.

15. The nuclear power generation complex as defined in claim 11, wherein said concrete slab is reinforced with steel bars.

16. The nuclear power generation complex as defined in claim 11, further comprising a vertical concrete wall extending upward from a periphery of said concrete slab, wherein soil surrounding said vertical wall and adjacent thereto is denser than other soil surrounding said denser soil and further removed from said vertical wall.

17. A method for constructing a nuclear power generation complex on a stratum of rock overlain by soil deposits so that damage from a seismic event will be mitigated, said complex comprising first and second buildings, comprising the steps of:

removing a top soil layer overlying a denser soil layer at a site;

constructing a foundation which is embedded in the rock stratum, said foundation comprising a horizontal floor which is supported above the surface of said rock stratum by a plurality of pedestals embedded in said rock stratum;

installing first and second sets of seismic isolators on said horizontal floor of said foundation;

constructing a first building so that it is supported only by said first set of seismic isolators; and constructing a second building so that it is supported only by said second set of seismic isolators.

18. The method as defined in claim 17, wherein said step of constructing a foundation comprises the steps of:

sinking the lower end of each one of a plurality of caissons through said denser soil layer into said rock stratum until the tops of said caissons all lie in a horizontal plane at a desired elevation;

filling said volumes inside said caissons with concrete; and installing said horizontal floor on top of said caissons.

19. The method as defined in claim 18, further comprising the step of dredging the volumes inside said caissons to remove loose rock, soil and water before said step of filling said volumes inside said caissons with concrete.

20. The method as defined in claim 17, further comprising the step of placing stabilized soil along the outer periphery of a vertical wall extending upward from a periphery of said horizontal floor.

* * * * *